United States Patent

Koelling et al.

[11] Patent Number: 6,140,861
[45] Date of Patent: Oct. 31, 2000

[54] BIAS PUMP ARRANGEMENT INCLUDING A SIGNAL-TRANSITION-DETECTION CIRCUIT

[75] Inventors: Jeffrey E. Koelling, Dallas; Ching-Yuh Tsay, Richardson, both of Tex.

[73] Assignee: Texas Instruments Incorporated, Dallas, Tex.

[21] Appl. No.: 08/266,912

[22] Filed: Jun. 27, 1994

[51] Int. Cl.$^7$ ........................................ G05F 3/02
[52] U.S. Cl. ................................. 327/536; 327/537
[58] Field of Search ............................ 327/122, 331, 327/390, 535, 536, 537, 538, 540, 541, 543, 589

[56] References Cited

U.S. PATENT DOCUMENTS

| | | | |
|---|---|---|---|
| 4,799,022 | 1/1989 | Skierszkan | 327/116 |
| 5,029,282 | 7/1991 | Ito | 327/541 |
| 5,111,066 | 5/1992 | Artieri et al. | 327/116 |
| 5,297,179 | 3/1994 | Tatsumi | 327/122 |

*Primary Examiner*—Terry D. Cunningham
*Attorney, Agent, or Firm*—Robby T. Holland; Carlton H. Hoel; Frederick J. Telecky, Jr.

[57] ABSTRACT

A circuit arrangement includes a charge pumping circuit (25) and a signal-transition-detection circuit (27). The charge pumping circuit is responsive to high and low level logic signals, for alternately storing charge in a pumping capacitor (34) and transferring the stored charge from the pumping capacitor to a load (22). The signal-transition-detection circuit is responsive to both negative-going and positive-going input signal transitions ($\overline{RL1}$) for producing and applying to the charge pumping circuit full-cycle logic signals (VPPTD). Plural signal-transition-detection circuits (27 and 57) can be used in tandem to increase benefits to the circuit arrangement.

5 Claims, 2 Drawing Sheets

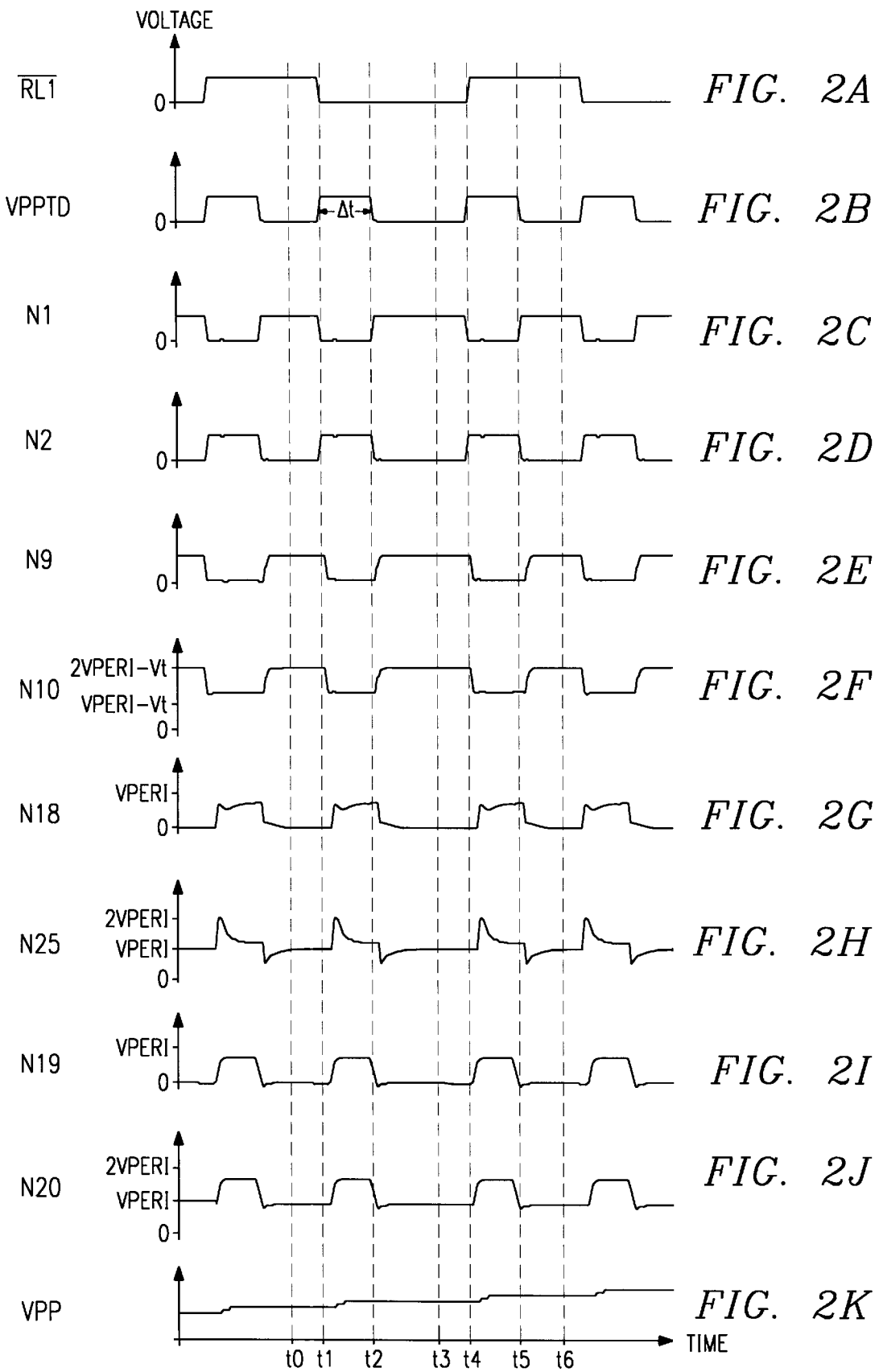

BIAS PUMP ARRANGEMENT INCLUDING A SIGNAL-TRANSITION-DETECTION CIRCUIT

FIELD OF THE INVENTION

This invention relates to an integrated circuit and more particularly to an integrated circuit bias pump arrangement.

BACKGROUND OF THE INVENTION

In dynamic random access memory (DRAM) devices using a charge pumping circuit, a charge pumping capacitor is booted to a high potential once during each access active pumping cycle for transferring charge to a load circuit. Thereafter during access precharge time, charge is restored to an unbooted, or precharge state, replacing the charge that was transferred out, or discharged, to the load during the last prior active pumping cycle.

As new generations of dynamic random access memory devices are designed, many choices of parameters are made. Design rules and device sizes may decrease, architecture may change, refresh timing may decrease, etc. As a result of all of the choices made, the device designer may have to provide either a larger capacitance charge pumping capacitor for a larger size load, the same capacitance charge pumping capacitor for the same size load, or possibly a smaller capacitance charge pumping capacitor if the load is smaller.

Another choice to be made during design is the physical layout area to be occupied by the various circuits to be included in the device. One of those circuits is the charge pumping circuit. There is a need for a charge pumping circuit that occupies less device surface area without reducing the quantity of charge that can be transferred to its load.

SUMMARY OF THE INVENTION

The aforementioned problems are resolved by a circuit arrangement that includes a charge pumping circuit and a first signal-transition-detection circuit. The charge pumping circuit is responsive to high and low level logic signals, for alternately storing charge in a pumping capacitor and transferring the stored charge from the pumping capacitor to a load. The first signal-transition-detection circuit is responsive to both negative-going and positive-going input signal transitions for producing and applying to the charge pumping circuit full-cycle logic signals.

In one aspect, the circuit arrangement includes at least one additional signal-transition-detection circuit interconnected in tandem with the first signal-transition-detection circuit between a terminal for receiving the input signal and the charge pumping circuit. This aspect provides an advantage of either increasing the quantity of charge transferred by a fixed area pumping capacitor during each input signal cycle or decreasing the size of the pumping capacitor for transferring the same quantity of charge during each input signal cycle.

BRIEF DESCRIPTION OF THE DRAWINGS

A better understanding of the arrangement and operation of exemplary embodiments of the subject invention can be derived from the subsequent detailed description if it is read with reference to the drawing wherein:

FIGS. 2a–2k form a timing diagram for the charge pumping circuit arrangement of FIG. 1.

DETAILED DESCRIPTION

Figure 1:
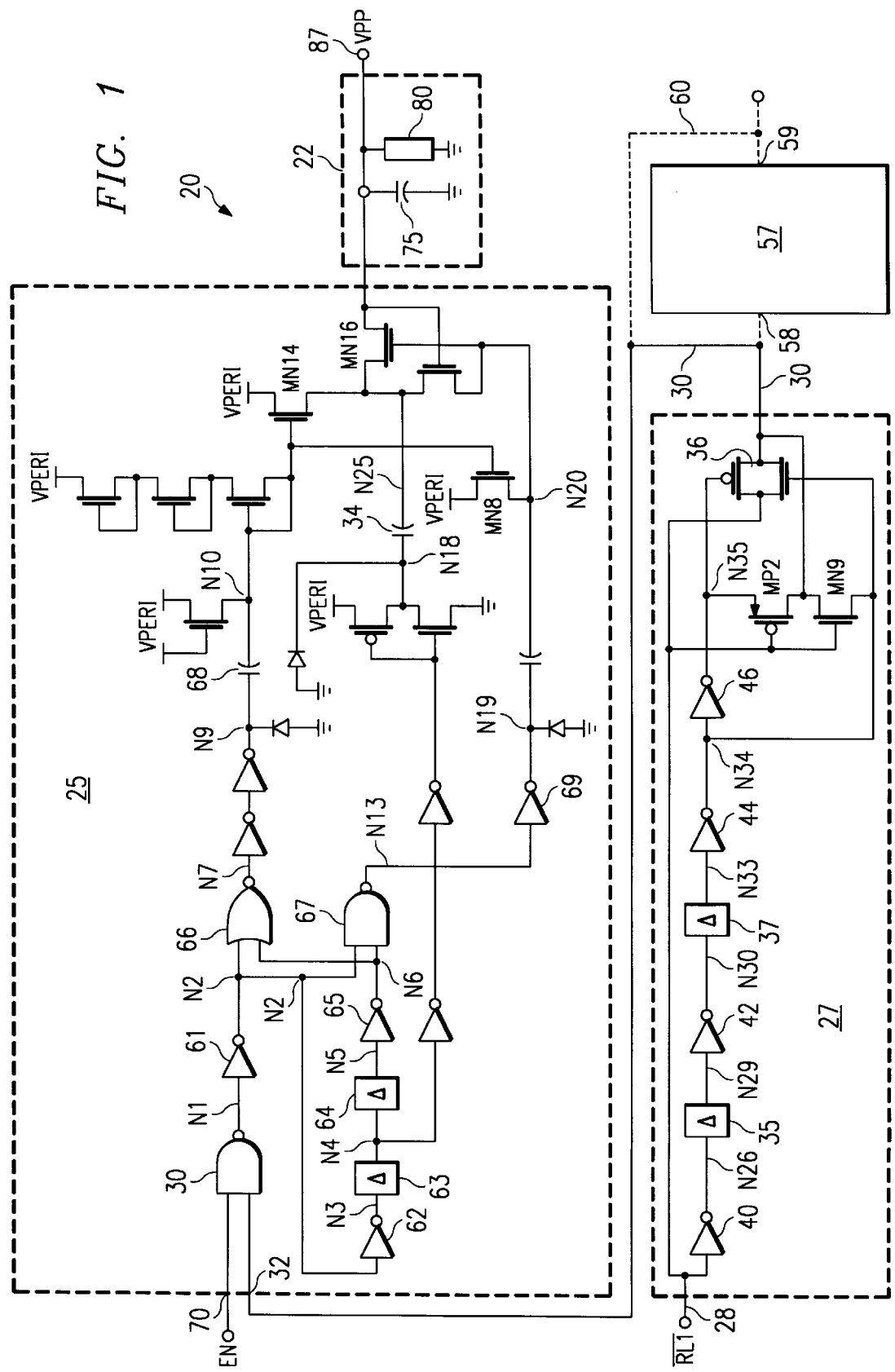
FIG. 1 is a logic schematic of a charge pumping circuit arrangement.

Referring now to FIG. 1, there is shown a circuit arrangement 20 for pumping charge to a load 22. The load may be an active circuit, such as the gate transistors of a memory array. The circuit arrangement 20 includes a charge pumping circuit 25 for alternately storing charge and transferring the stored charge to the load 22. A signal-transition-detection circuit 27 receives an input row logic signal $\overline{RL1}$ on an input lead 28 including positive-going and negative-going transitions, each of which causes the circuit 27 to produce a full-cycle logic signal. Row logic signal $\overline{RL1}$ is a clock signal that is derived from a row address strobe signal $\overline{RAS}$ and that has a repetition rate corresponding to the operating frequency of the dynamic random access memory. The full-cycle logic signals are carried over a lead 30 to an input terminal 32 of the charge pumping circuit 25. Each full-cycle logic signal applied to the input terminal 32 causes the charge pumping circuit 25 to complete both an access active cycle and an access precharge cycle.

Since the positive-going and negative-going transitions of the row logic signal $\overline{RL1}$ both produce full-cycle logic signals on the transition detection signal VPPTD, the charge pumping circuit 25 double pumps during each complete cycle of the input signal $\overline{RL1}$. Thus charge twice is stored up in a pumping capacitor and is transferred to the load 22 for each complete cycle of the input signal $\overline{RL1}$. This double pumping action provides an opportunity for reducing the capacitance and therefore the surface area of a pumping capacitor 34 included within the charge pumping circuit 25.

Operation of the circuit arrangement 20 can be more fully understood by the following more detailed description that is presented with reference to the waveforms of the timing diagram of FIGS. 2a–2k.

The signal-transition-detection circuit 27 performs as follows. Initially at time t0 the row logic signal $\overline{RL1}$ on the input lead 28 is at a high logic level, as shown in FIG. 2a, and a transition detection signal VPPTD on the lead 30 is at a low logic level, as shown in FIG. 2b. At this time, a pass gate 36 is off and the level of the transition detection signal VPPTD on the lead 30 is controlled by the output of an inverter arrangement including transistors MP2 and MN9. The transistor MN9 is on and the transistor MP2 is off.

When the row logic signal $\overline{RL1}$ on the lead 28 commences a first transition going high-to-low at time t1 in FIG. 2a, the transistor MN9 immediately turns off and the transistor MP2 turns on. A high level logic signal on a node N35 is driven through the transistor MP2 causing the transition detection signal VPPTD on the lead 30 to go high in response to detecting the high-to-low transition in the row logic signal $\overline{RL1}$.

The pass gate 36 remains turned off for a delay time. A path through the signal-transition-detection circuit 27 includes two non-symmetrical delay devices 35 and 37 connected in tandem with three inverters 40, 42 and 44. Each of the delay devices 35 and 37 imparts a delay when transmitting a negative-going transition and immediately transmits any positive-going transition. Since the row logic signal $\overline{RL1}$ is negative-going, the node N26 has a positive-going transition. The delay device 35 immediately applies the positive-going transition to the inverter 42. A resulting negative-going transition on the node N30 is coupled after a delay time through the delay device 37 to a node N33.

When the node N33 is at the low logic level, it is inverted by the inverter 44 to a high logic level on a node N34. Another inverter 46 again inverts the high logic level to the low logic level at the node N35. With the low logic level on the node N35 and the high level on the node N34, the inverter arrangement including the transistors MP2 and MN9 is disabled. It discontinues controlling the transition detection signal VPPTD on the lead 30.

Simultaneously the pass gate 36 is turned on by the high logic level on the node N34 and the low logic level on the node N35. The low logic level of the row logic signal $\overline{RL1}$ on the input lead 28 now passes through the pass gate 36 and determines the logic level of the transition detection signal VPPTD at time t2 in FIG. 2b. This causes a high-to-low transition in the transition detection signal VPPTD after a delay time Δt.

Thus the transition detection signal VPPTD on the lead 30 has made both the low-to-high transition at the time t1 and the high-to-low transition at the time t2 in response to the negative-going transition in the row logic signal $\overline{RL1}$ on the input lead 28.

Next the row logic signal $\overline{RL1}$ commences a second transition when it goes from the low logic level to the high logic level at a time t4 in FIG. 2a. Initially the pass gate 36 remains turned on, and the positive-going transition of the row logic signal $\overline{RL1}$ is passed through the pass gate 36 as a rising edge of the transition detection signal VPPTD on the lead 30 indicating detection of the second transition in the row logic signal $\overline{RL1}$ on the input lead 28.

Simultaneously in response to the row logic signal $\overline{RL1}$ making the positive-going transition at the time t4 and because of an inversion by the inverter 40, the node N26 makes a negative-going transition to the low logic level. After a falling edge delay in the delay circuit 35, the node N29 also goes to the low logic level. An inverter 42 is responsive to the low logic level on the node 29 and causes its own output at the node N30 to go to the high logic level.

Because of the positive-going transition on the node N30, there is no delay caused by the delay circuit 37. Thus its output at the node N33 immediately goes to the high logic level. An inverter 44, in response to the high logic level on the node N33, produces a low logic level on the node N34.

Another inversion by the inverter 46 produces the high logic level on the node N35. This high logic level at the node N35 together with the low logic level on the node N34 turns off the pass gate 36. Simultaneously, the low logic level on node N34 and the high logic level of the row logic signal $\overline{RL1}$ turn on the transistor MN9, which pulls the transition detection signal VPPTD on the lead 30 to the low logic level, as shown at time t5 in FIG. 2b. The transistor MP2 is turned off because the logic levels of the node N35 and of the row logic signal $\overline{RL1}$ are both the high logic levels.

When the transition detection signal VPPTD on the lead 30 goes low at the time t5, as just described, the signal-transition-detection circuit 27 completes the detection of the second and positive-going transition in the row logic signal $\overline{RL1}$. Thus two complete logic signal cycles are produced between the times t0 and t6 in the transition detection signal VPPTD of FIG. 2b on the lead 30 in response to one cycle of the input row logic signal $\overline{RL1}$ of FIG. 2a.

In an alternative embodiment, two or more transition detection circuits, such as transition detection circuits 27 and 57 of FIG. 1 can be connected in tandem. The output lead 30 of the transition detection circuit 27 is connected to an input 58 of the transition detection circuit 57 but not to the input 32 of the pumping circuit 25. In such tandem arrangement, only the output 59 of the latter transition detection circuit 57 is connected by way of a lead 60 to the input 32 of the pumping circuit 25. Considering an integer N equal to the number of transition detection circuits, connected in tandem, the pumping circuit 25 will receive an input signal with a number of transitions equal to $2^N$ times the number of transitions in the input row logic signal $\overline{RL1}$ of FIG. 2a. This relationship is important for determining the capacitance of a pumping capacitor 34 included the pumping circuit 25, which is to be described.

Turning now to the operation of the charge pumping circuit 25, it pumps $2^N$ full quantities of charge from a charge pumping capacitor 34 to the load 22 for each complete cycle of the input row logic signal $\overline{RL1}$ of FIG. 2a. When the charge pumping circuit 25 is enabled by a high logic level input signal EN on its input terminal 70, it operates in response to the transition detection signal VPPTD which is applied by way of either the lead 30 or the lead 60.

The following describes the operation of the charge pumping circuit 25 when it operates in response to the transition detection signal VPPTD, produced by the single signal-transition-detection circuit 27 on the lead 30. The numeral N equals one. For accessing a row line in a memory array, the charge pumping circuit 25 operates in an access active cycle between times t1 and t4 in the FIGS. 2a–2k. Thereafter and before a subsequent active access cycle, the charge pumping circuit 25 operates in an access precharge cycle between the time t4 and t1 in the FIGS. 2a–2k.

Commencing in a precharge state at the time t0, the charge pumping circuit 25 next responds to the transition detection signal VPPTD making the positive-going transition to the high logic level on the input 32 at the time t1 in FIG. 2b. As a result, a node N1 goes to the low logic level, as shown in FIG. 2C, and after an inversion by an inverter 61, a node N2 goes to the high logic level, as shown in FIG. 2d. With the high logic level on the node N2, the output from a NOR gate 66 and a node N9 both go to the low logic level, as shown at time t1 in FIG. 2e. This low logic level on the node N9 causes a capacitor 68 to pull its opposite plate at node N10 to a potential VPERI–Vt, which turns off a pre-charge transistor MN14. The potential on the node N10 is shown in FIG. 2f.

While the nodes N1 and N2 are at the low and high logic levels, respectively between the times t1 and t2, the latter level is inverted by an inverter 62 to produce a low logic level on a node N3. A delay circuit 63 produces the low logic level on a node N4 after a short delay time. This low logic level at the node N4 is inverted to a high logic level, e.g., VPERI, on a node N18 and a first plate of the pumping capacitor 34, as shown shortly after the time t1 in FIG. 2g. Raising the first plate of the capacitor 34 to the high logic level boots the other, or second, plate of that pumping capacitor 34 at a node N25 from the voltage VPERI level to two times the voltage VPERI level, or 2* VPERI, as shown in FIG. 2h.

After another short delay time traversing another delay circuit 64, the negative-going transition at the node N4 causes a node N5 to go to the low logic level which is inverted to the high logic level on a node N6 by an inverter 65. Because the node N2 already is at the high logic level when the node N6 goes high, a NAND gate 67 produces a low logic level at its output on a node N13. An inverter 69 inverts this low logic level to a high logic level on a node N19, as shown in FIG. 2i. This high level on the node N19 boots a node N20 to twice the voltage VPERI level, or 2* VPERI, as shown in FIG. 2j. This booted potential on the node N20 is applied to a control gate electrode of a pass-gate transistor MN16, turning on that pass-gate transistor. Once the pass-gate transistor MN16 is turned on, a full charge transfers from the pumping capacitor 34 to a filtering capacitor 75 in the load 22 and to a load circuit 80, e.g. the wordlines. The capacitor 75 filters out noise and retains a relatively stable d.c. level voltage.

FIG. 2k shows a potential VPP on a terminal 87 of the load circuit 80 being pumped to a higher voltage level between the times t1 and t2. Thus the pumping part of the access active cycle is completed with the transfer of charge from the pumping capacitor 34 to the load 22.

Once the charge has been transferred by the time t2 in FIG. 2, the charge pumping circuit 25 commences an access precharge cycle by responding to the transition detection signal VPPTD of FIG. 2b making the negative-going transition to the low logic level on the input 32 at the time t2 while the enable signal EN remains at the high level. As a result, the NAND gate 30 produces the high logic level on the node N1, the inverter 61 produces the low logic level on the node N2, and the inverter 62 produces a positive-going transition to the high logic level on the node N3. The low logic level on the node N2 causes the NAND gate 67 to unconditionally produce the high logic level on the node N13 and the inverter 69 to produce a low logic level on the node N19, as shown at time t2 in FIG. 2i. The potential on the node N20 follows to the potential of VPERI also at the time t2, as shown in FIG. 2j. This potential on the node N20 turns off the pass-gate transistor MN16. Without a delay time, the potentials on the nodes N4 and N5 go to the high logic level, as a result of node N3 being at the high logic level, and the potential of node N6 goes to the low logic level, as a result of inversion operation by inverter gate 65. Since the output of the NAND gate 67 is already high, as a result of the low logic level on node N2, the low logic level on the node N6 has no effect.

Once the pass-gate transistor MN16 is turned off, no more charge is transferred from the pumping capacitor 34 to the load 22.

With the node N4 at the high logic level, the node N18 goes to the low logic level on the first plate of the pumping capacitor 34. This brings the second plate of the pumping capacitor 34 at the node N25 down by VPERI after the time t2, as shown in FIG. 2h.

Since the potentials on the nodes N2 and N6 both are at the low logic level, the NOR gate 66 causes the node N7 and, subsequently through two inversions, the node N9 and the first plate of the precharge capacitor 68 to go to the high logic level. This boots the second plate of the precharge capacitor 68 at the node N10 up to a potential of two times VPERI minus Vt, or 2* VPERI–Vt, which turns on the precharge gate transistor MN14. Once the precharge transistor MN14 is turned on, the voltage level at node N25 on the second plate of the pumping capacitor 34 is brought to its precharge potential VPERI by a time t3, as shown in FIG. 2h. Thus the charge is restored in the pumping capacitor 34 to the precharge level. The potential on the node N10 also enables a transistor MN8 to bring the node N20 to the potential VPERI.

This completes for the memory array one half of the access active cycle which is initiated by the falling edge of the row logic signal $\overline{RL1}$ shown in FIG. 2a. Only the single transition detection circuit is included.

Commencing at the time t4 in FIGS. 2a–2k, the access precharge cycle for the memory array is initiated. At the time t4, the positive-going transition of the row logic signal $\overline{RL1}$ is detected by the transition detection circuit 27. The transition detection signal VPPTD makes positive-going and negative-going transitions, respectively at the times t4 and t5, as previously described. These signal transitions on the lead 30 are applied to the input 32 of the charge pumping circuit 25 which responds by transferring another quantity of charge from the charge pumping capacitor 34 to the load 22. Thereafter the pass-gate transistor MN16 is turned off and the precharge transistor MN14 is turned on to again precharge the pumping capacitor 34.

Thus the arrangement including the single transition detection circuit 27 has twice pumped the full quantity of charge from the pumping capacitor 34 to the load 22 in response to a single cycle of the row logic signal $\overline{RL1}$. This allows the pumping capacitor 34 to be sized at $½^N$, where N equals one, of the capacitance needed in any pumping circuit operating without the transition detection circuit 27.

Taking the foregoing discussion a step further, the second transition detection circuit 57 is connected in tandem with the transition detection circuit 27. The numeral N equals two transition detection circuits. With this arrangement, the pumping circuit 25 receives four logic signal cycles on the lead 60 in response to the single cycle of the row logic signal $\overline{RL1}$. As a result, the pumping capacitor 34 transfers four quantities of charge to the load 22, in response to the single logic signal cycle of the row logic signal $\overline{RL1}$. Thus the pumping capacitor can be sized at $½^N$, where N equals two, of the capacitance needed in any pumping circuit operating without the transition detection circuits 27 and 57.

The foregoing describes the arrangement and operation of some illustrative embodiments of the invention. Those described embodiments together with other embodiments which are obvious in view thereof are considered to fall within the scope of the appended claims.

What is claimed is:

1. A circuit comprising:
   a charge pumping circuit, responsive to a signal having high and low levels on a lead, for alternately storing charge in a pumping capacitor and transferring the stored charge from the pumping capacitor to a load;
   a terminal for receiving an input signal having negative-going and positive-going transitions;
   a first signal-transition-detection circuit, responsive to the negative-going input signal transitions on the terminal, for producing and applying to the lead of the charge pumping circuit a full-cycle signal having high and low levels for each negative-going input signal transition; and
   the first signal-transition-detection circuit, further responsive to the positive-going input signal transitions on the terminal, for producing and applying to the lead of the charge pumping circuit a full-cycle signal having high and low levels for each positive-going input signal transition.

2. A circuit, in accordance with claim 1, wherein the load includes:
   a filtering capacitor; and
   a load circuit.

3. A circuit, in accordance with claim 2, wherein
   at least one additional signal-transition-detection circuit is interconnected in tandem with the first signal-transition-detection circuit between the terminal for receiving the input signal and the charge pumping circuit.

4. A circuit, in accordance with claim 3, wherein
   the pumping capacitor has a capacitance that is inversely proportional to $2^N$, where N is a number of signal-transition-detection circuits connected in tandem between the terminal for the input signal and the charge pumping circuit.

5. A circuit, in accordance with claim 1, wherein
   the charge pumping circuit is fabricated on an integrated circuit substrate; and
   the first signal-transition-circuit is fabricated on the integrated circuit substrate.

* * * * *